United States Patent [19]

Hassemer et al.

[11] Patent Number: 5,432,017
[45] Date of Patent: Jul. 11, 1995

[54] BATTERY PACK AND METHOD OF FORMING SAME

[75] Inventors: Brian J. Hassemer, Gurnee; Scott D. Beutler, Barrington, both of Ill.; Adnan Aksoy, Boca Raton; Mark S. Bresin, Coral Springs, both of Fla.

[73] Assignee: Motorola, Inc., Schaumburg, Ill.

[21] Appl. No.: 267,221

[22] Filed: Jul. 1, 1994

Related U.S. Application Data

[63] Continuation of Ser. No. 123,775, Sep. 20, 1993, abandoned, which is a continuation-in-part of Ser. No. 944,610, Sep. 14, 1992, Pat. No. 5,298,347.

[51] Int. Cl.⁶ .................... H01M 2/10; H01M 6/00
[52] U.S. Cl. .............................. 429/4; 429/99; 429/159; 429/163; 29/623.4
[58] Field of Search .................. 429/96–100, 429/159, 163, 4; 206/333; 307/150; 29/623.1, 623.4; 228/901; 156/73.1

[56] References Cited

U.S. PATENT DOCUMENTS

| | | |
|---|---|---|
| 3,900,341 | 8/1975 | Shoichiro . |
| 3,933,526 | 1/1976 | Rackin . |
| 3,941,618 | 3/1976 | Mabuchi . |
| 4,169,920 | 10/1979 | Epstein . |
| 4,190,702 | 2/1980 | Pun et al. . |
| 4,194,061 | 3/1980 | Land et al. . |
| 4,259,416 | 3/1981 | Ikeda et al. . |
| 4,265,984 | 5/1981 | Kaye . |
| 4,284,691 | 9/1981 | Goebel et al. . |
| 4,471,035 | 7/1984 | Goebel et al. . |
| 4,546,056 | 10/1985 | Jessen et al. . |
| 4,592,972 | 6/1986 | Juergens et al. . |
| 4,678,725 | 7/1987 | Kikuchi et al. . |
| 4,829,224 | 5/1989 | Gandelman et al. . |
| 4,861,685 | 8/1989 | Tien et al. . |
| 4,880,712 | 11/1989 | Gordecki . |
| 4,895,777 | 1/1990 | Kagawa . |
| 4,981,490 | 1/1991 | Machida . |
| 5,015,546 | 5/1991 | Dulaney et al. ............ 429/99 |
| 5,096,788 | 3/1992 | Bresin et al. . |
| 5,104,754 | 4/1992 | Dorinski et al. . |
| 5,122,427 | 6/1992 | Flowers et al. . |
| 5,122,927 | 6/1992 | Satou ............ 429/98 X |
| 5,135,822 | 8/1992 | Okamoto . |
| 5,149,603 | 9/1992 | Fleming et al. ............ 429/98 |
| 5,173,379 | 12/1992 | Ichinose et al. . |

Primary Examiner—Anthony Skapars
Attorney, Agent, or Firm—John J. King

[57] ABSTRACT

A battery pack containing a battery of cells includes an outer casing (402) adapted to receive a battery of cells (404); a bonding surface (410) positioned along the outer casing (402); an inner casing (408) adapted to encapsulate the battery of cells (404) and having a surface for bonding to the bonding surface of the outer casing (402); and a bond provided at the bonding surface to bond the inner casing (408) to the outer casing (402). Also, a method for forming a battery pack comprises steps of positioning a battery of cells within a bonding surface of an outer casing of the battery pack; encapsulating the battery of cells with an inner casing, the inner casing having a surface corresponding to the bonding surface of the outer casing; and bonding the corresponding surface of the inner casing to the bonding surface of the outer casing. The battery pack and method for forming the battery pack reduce the weight and complexity in manufacturing.

27 Claims, 7 Drawing Sheets

BATTERY PACK AND METHOD OF FORMING SAME

REFERENCE TO PRIOR APPLICATIONS

This is a continuation of application Ser. No. 08/123,775, filed 09/20/93 and now abandoned which is a continuation-in-part of the instant assignee's U.S. application Ser. No. 07/944,610, now U.S. Pat. No. 5,298,347 entitled Battery Pack, filed on Sep. 14, 1992 by Adnan Aksoy and Mark S. Bresin as common inventors of the present invention. Applicants claim priority of invention under 35 USC Section 120.

FIELD OF THE INVENTION

This invention relates generally to battery cell packs, and more specifically to battery pack construction.

BACKGROUND

Battery packs for portable devices such as two-way radios typically comprise a number of cells having contacts welded together all within a housing. The individual cells are interconnected using sheet metal tabs which are spot welded to the cell terminals. Usually, the interconnected cells are then spot welded to a flex circuit and subsequently inserted into a battery housing. This method of manufacture is wrought with inefficient assembly procedures and unnecessary parts and labor resulting in excessive manufacturing expense and compromised reliability.

Consumer loaded batteries for consumer electronics such as cameras, radios, CD players, etc., typically have spring loaded contacts on one end and metal contacts coupled to the opposite end of the primary cells. Consumer loaded battery packs do not require the extra circuitry typically found in battery packs. Battery packs for portable radios will usually include resistors, thermistors, diodes and other components that enable the battery packs to be rechargeable and/or intrinsically safe. Thus, consumer loaded battery compartments may only have stamped metal on the housing and electrical loss between battery cells and circuitry is of little concern in these applications.

Other battery packs, which are either consumer loaded or loaded and sealed by the manufacturer typically comprise a number of cells that are shrink wrapped together or packaged in a plastic housing. Again, many of these cells are typically coupled together electronically by welding steel tabs to unlike terminals (positive and negative) on separate cells. Subsequently, the welded cells are shrink wrapped together and inserted into a housing. Again, this assembly procedure is inefficient, resulting in excessive labor and manufacturing costs.

The drive to reduce weight in electronic consumer products is now impacting battery pack assembly as much as the drive to increase the ease of assembly or manufacturability of battery packs. Therefore, the ability to integrate features in less components and parts is critical in reducing the number of assembling steps. Therefore, a need exists for a battery pack that provides the convenience of consumer loaded battery packs, provides for a reduction in weight, and allows for greater efficiency and reduced cost in assembly and manufacture.

DETAILED DESCRIPTION OF THE PREFERRED EMBODIMENT

A battery pack comprises a first housing member having an integrated latch feature, a header frame detachably mounted to the first housing member, a plurality of cells for insertion into the header frame and first housing member, circuitry on the header for coupling the plurality of cells and providing charger and power contacts, and a second housing member being substantially laminar and being adhesively attached to said first housing member.

Figure 1:
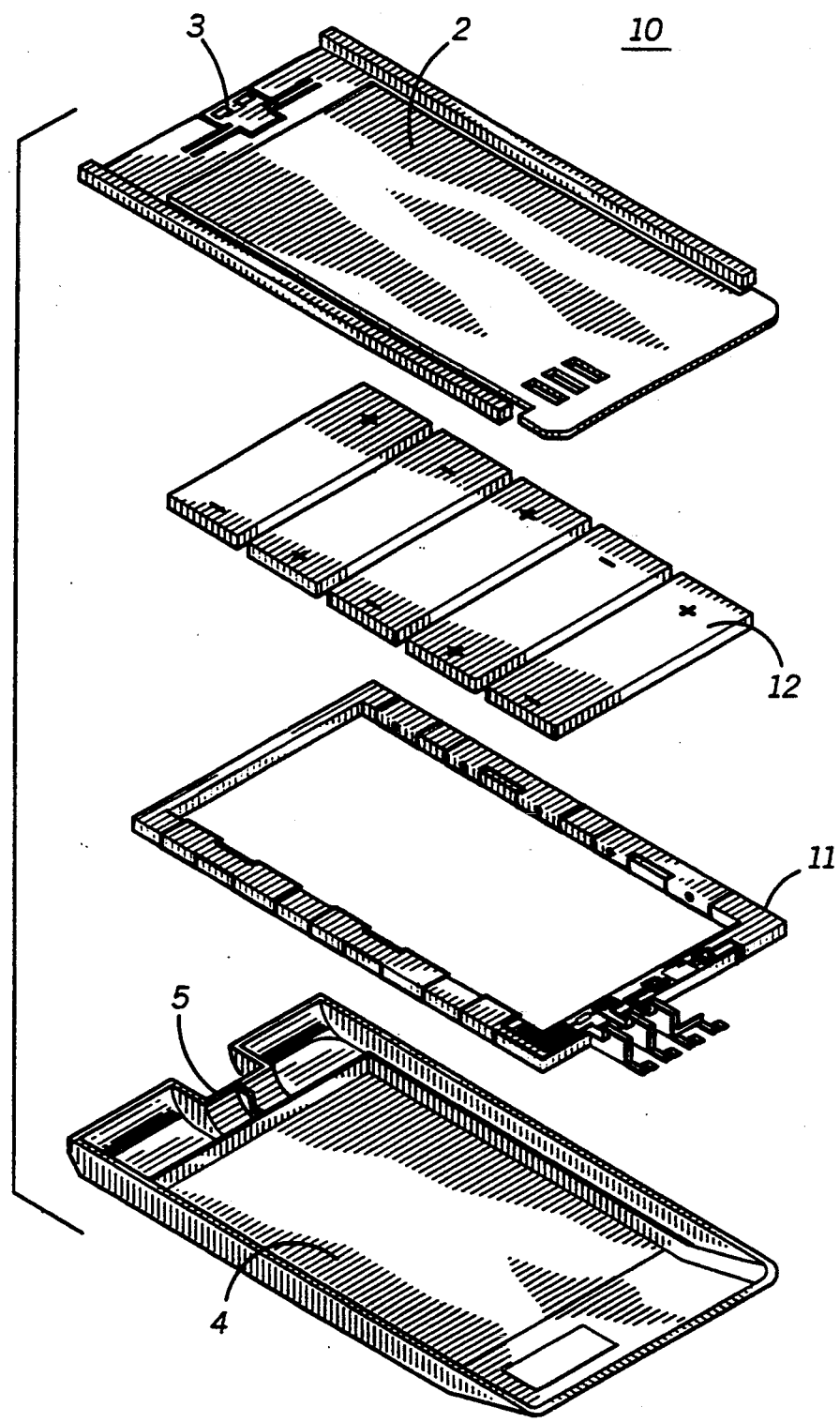
FIG. 1 is a perspective view of a battery pack.

Referring to FIG. 1, there is shown a perspective view of a battery pack 10 discussed in U.S. patent application Ser. No. 07/848465 entitled Weldless Battery Pack, filed on Mar. 9, 1992 by Mark S. Bresin, assigned to the present assignee, Motorola, Inc. and hereby incorporated by reference. The battery pack 10 comprises a housing having a top portion 2 and a bottom portion 4. The housing portions are preferably constructed to snap together. Alternatively, the housing portions could be ultrasonically welded together. The top housing member 2 also includes a latch feature 3 that mates with a recessed area 5 in the bottom portion 4 to allow the detachable coupling of the battery pack 10 to a radio (not shown). Within the housing portions 2 and 4, lies a header frame 11 (for holding cells 12) being detachably mounted into at least one of the housing portions.

Figure 2:
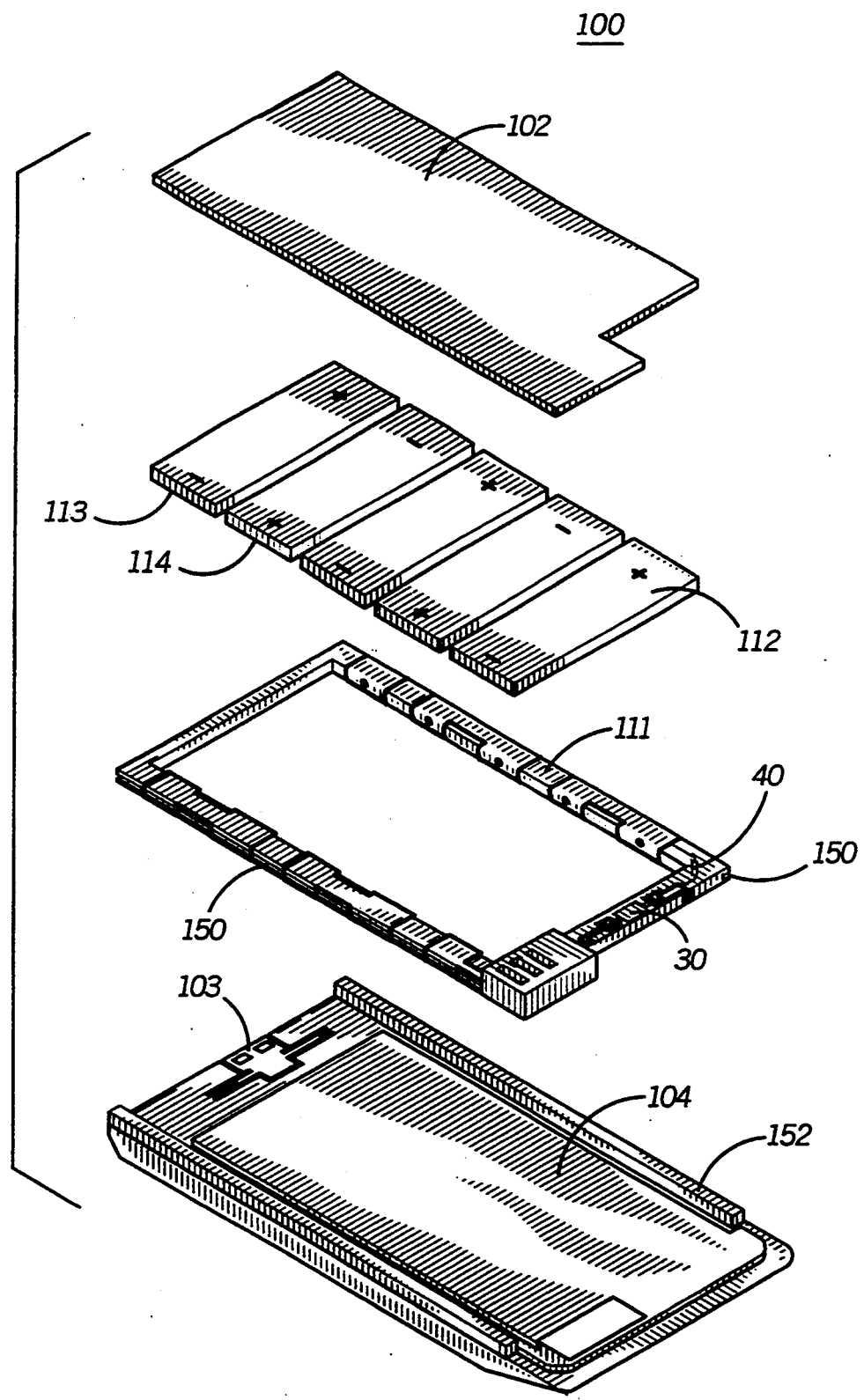
FIG. 2 is a perspective view of a battery pack according to a first embodiment of the present invention.

Referring to FIG. 2, there is shown a perspective view of a battery pack 100 in accordance with the present invention. The battery pack 100 preferably comprises a first housing member 104 having a latch feature 103 incorporated or integrated into the first housing member 104. Next, a header frame 111 is mounted into the first housing member 104. The header frame is preferably snapped into the first housing member via the groove 150 in the header and the mating railing 152 within the housing member 104. Alternatively, the header frame 111 could be integrated as part of the first housing member 104 as well. Another option is to ultrasonically weld the header frame 111 to the first housing member 104. Battery cells 112 having positive and negative terminals 114 and 113 respectively are then oriented and inserted into the header frame 111. Circuitry means preferably including resistors (not shown), polyswitches (30), and thermistors (40) are mounted on the header frame 111 to provide charging and power contacts and the appropriate circuitry for safely charging rechargeable battery packs as is known in the art. Alternatively, the circuitry means could comprise a flex circuit having some of the components such as the resistors, polyswitches and thermistors, which further interconnects the cells. Finally, a second housing member 102 is preferably adhesively attached to the first housing member. In order to maximize the reduction in weight, the second housing member 102 is preferably a laminar piece of plastic such as polycarbonate having adhesive on it's interior surface for adhering to the first housing member 104. Alternatively, the second housing member 102 could be ultrasonically welded to the first housing member 104. Additionally, the second housing member 102 could serve as a label for the battery 100.

Figure 3:
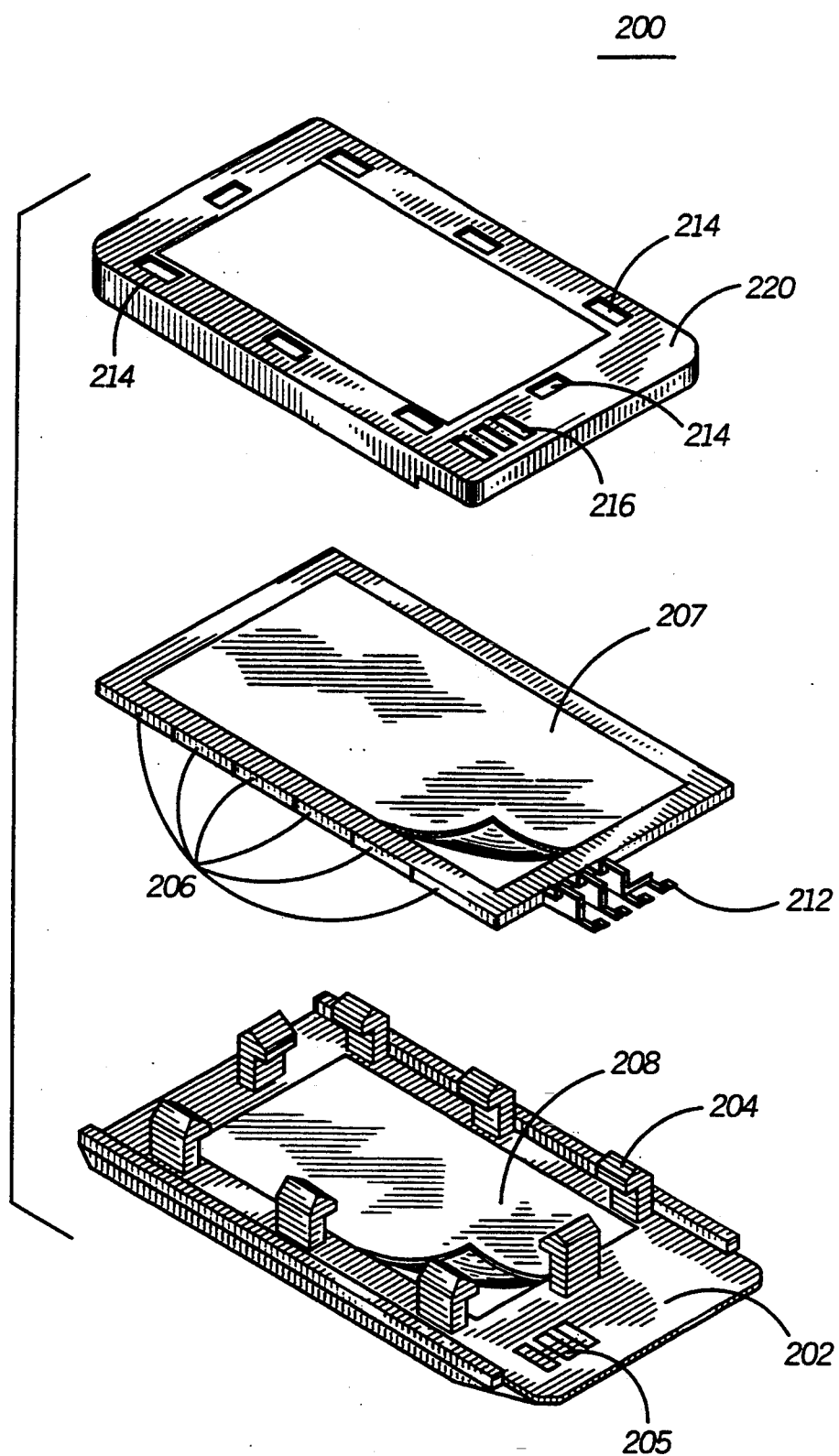
FIG. 3 is a perspective view of a battery pack according to a second embodiment of the present invention.

Referring to FIG. 3, there is shown an alternative battery pack 200 in accordance with the present invention. The pack 200 comprises a first housing 202 preferably having snap features 204 integrally formed in the first housing. A plurality of cells 206, preferably prepackaged into a cell pack is placed and retained within the snap features 204. The cell pack also preferably includes a flex circuit 212 providing further interconnection between cells, contacts and other required components such as resistors and thermistors (not shown). Finally a second housing member 220 is placed on top of the cell pack 206 and snaps to the first housing member 202. The Second housing member preferably has openings 21 4 for retention by the snap features 204. Additionally, openings 216 are formed in the second housing member allowing for contact points when contacts shown on the flex 21 2 are inserted within the openings 216. Likewise, the first housing member 202 has openings 205 allowing for the insertion of contact points shown on the flex 21 2. Optionally, further integrity can be provided to the battery pack 200 by using double sided adhesive (208) (such as tape) between the inner potion of the first housing and the bottom of the cell package 206 and using double sided adhesive (207) between the inner portion of the second housing 220 and the top of the cell package 210.

Figure 4:
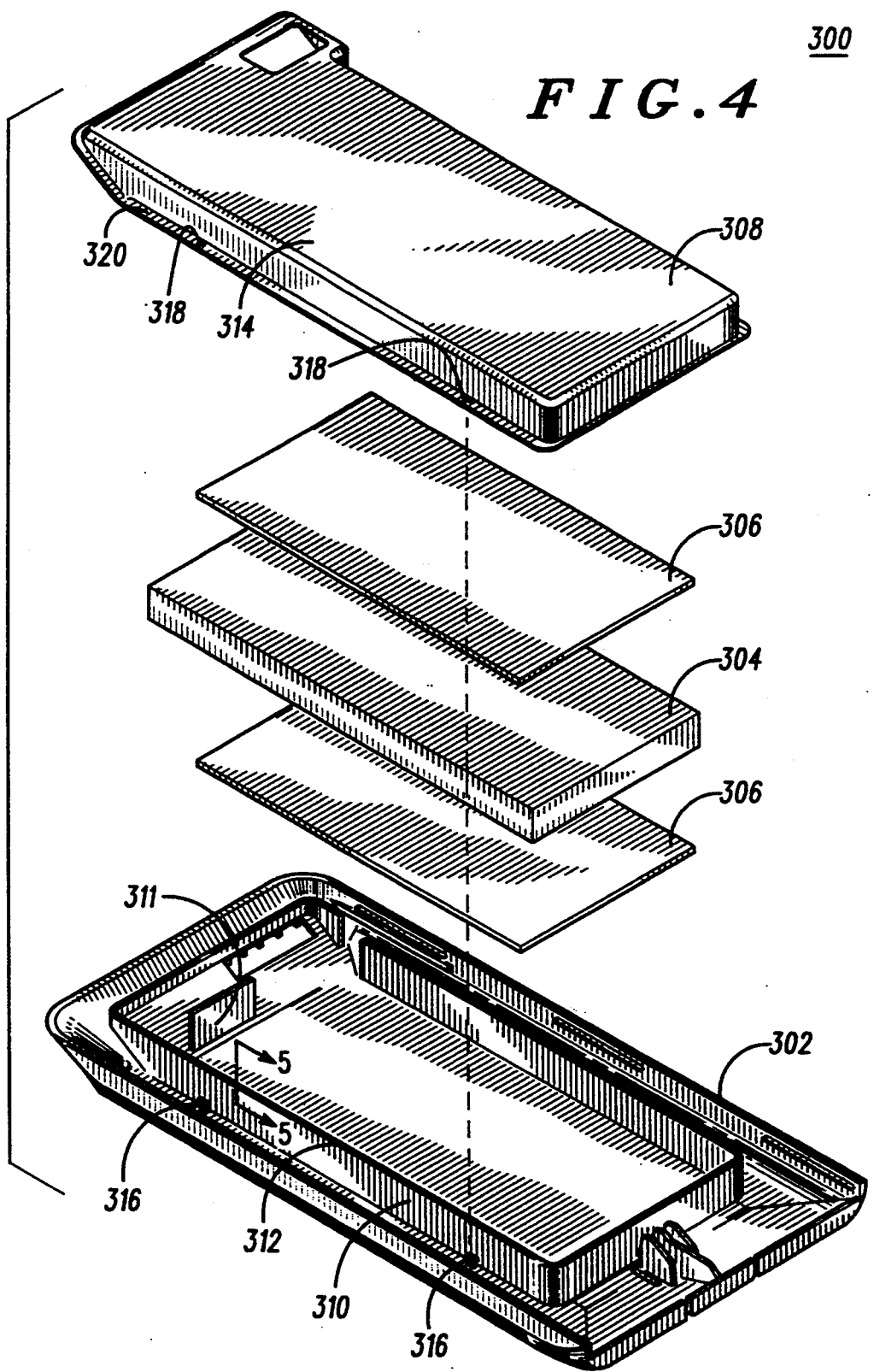
FIG. 4 is a perspective view of a battery pack according to a third embodiment of the present invention.

Referring to FIG. 4, a third embodiment of a battery pack according to the present invention is shown. The battery pack generally includes a base portion or outer casing 302 adapted to hold a battery of cells 304. It will be understood that battery 304 will include any flex strips or circuitry described in earlier embodiment. In order to maintain battery 304 within the outer casing 302, one or more layers of adhesive material 306 could be used. For example, adhesive 306 could be a glue or some form of double sided tape. An adhesive layer 306 could be used to attach the battery 304 to the outer case 302. Also, another adhesive layer 306 could be employed on top of the battery to attach an inner casing 308 to maintain battery 304 within outer casing 302.

Figure 5:
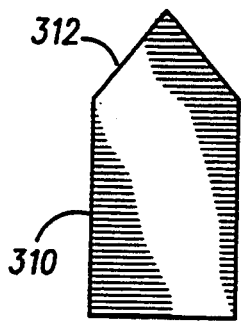
FIG. 5 is an exploded view of wall 310 taken at lines A—A in FIG. 4.

Generally, outer casing 308 is adapted to fit over a wall 310 generally extends around the periphery of outer casing 302. Wall 310, abutment 311 and any adhesive 306 which may be used prevents battery 304 from shifting within outer casing 302. Inner casing 308 is composed of a molded thermoformed plastic material or some other suitable material. Preferably, inner casing 308 includes a label integrally formed in the thermoformed plastic. Wall 310 preferably includes an energy director 312 (shown in detail in the cross section of FIG. 5 taken at lines A—A of FIG. 4). Energy director 310 is employed in an ultrasonic bonding technique. In particular, a shoulder portion 314 of outer casing 308 can be ultrasonically bonded to energy director 312. The ultrasonic bonding can be provided along the entire wall 310 or at selected portions as needed. Any ultrasonic bonding mechanism which is well known in the art could be used.

Also, an attachment mechanism includes a plurality of tab portions 316 positioned around the base of wall 310 to attach inner casing 308 to outer casing 302. Corresponding receiving portions 318 along a foot 320 are included in outer casing 308. A variety of embodiments for latch 316/receiving portion 320 are described in detail in reference to FIGS. 6–8. Finally, an adhesive material can be positioned around foot 310 to attach inner casing 308 to outer casing 302. Any one or any combination of the adhesive bonding, ultrasonic bonding and latching can be used.

Figure 6:
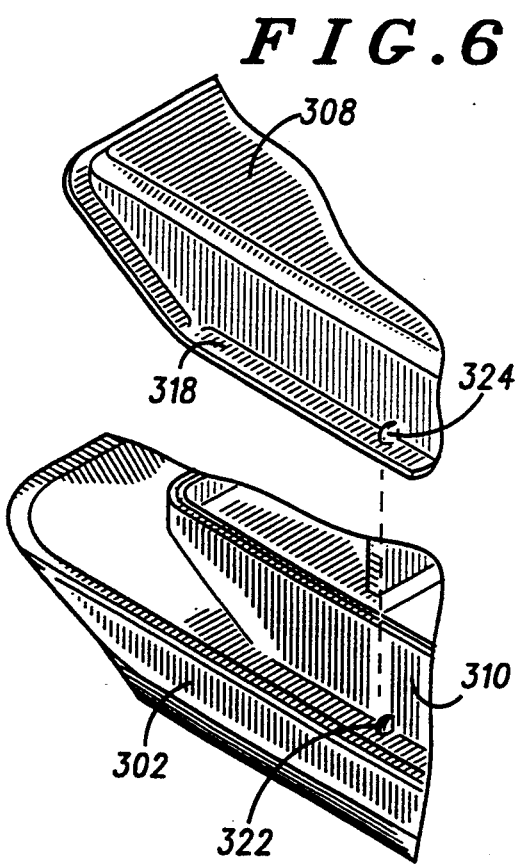
FIG. 6 is an exploded view of a first embodiment of an attachment mechanism according to the present invention.

Referring to FIG. 6, an exploded view of a first embodiment of an attachment mechanism is shown. The attachment mechanism includes a tab 322 which is generally inserted into a dimple 324. The attachment mechanism of FIG. 6 could be used, for example, to maintain the position of inner casing 308 relative to outer casing 302 when ultrasonic bonding.

Figure 7:
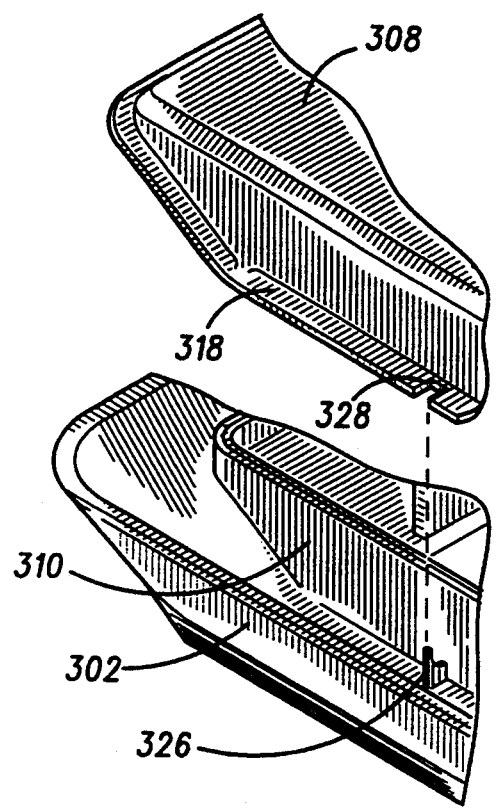
FIG. 7 is an exploded view of a second embodiment of an attachment mechanism according to the present invention.

Referring to FIG. 7, an exploded view of a second embodiment of an attachment mechanism is shown. The attachment mechanism includes a tab portion 326 adapted to retain a notch 328 of outer casing 308. The attachment mechanism of FIG. 6 could also be used to maintain the position of inner casing 308 relative to outer casing 302 when ultrasonic bonding.

Figure 8:
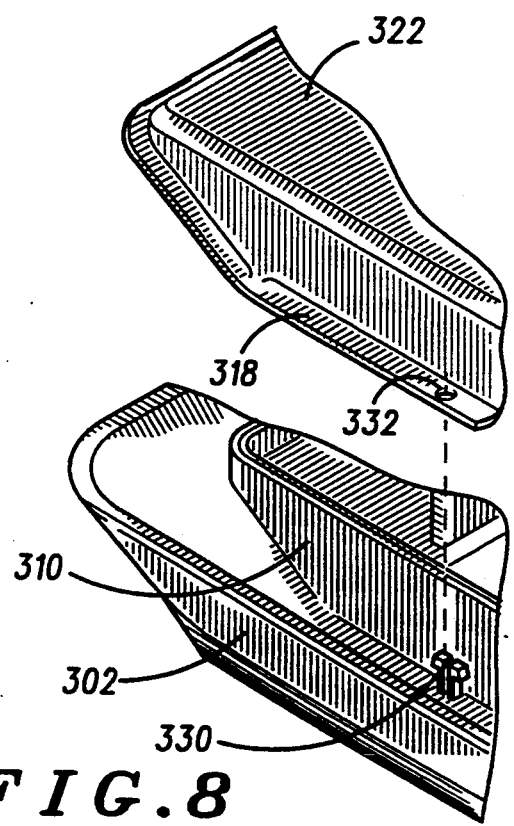
FIG. 8 is an exploded view of a third embodiment of an attachment mechanism according to the present invention.

Finally, referring to FIG. 8, an exploded view of a third embodiment of an attachment mechanism is shown. The attachment mechanism includes a latch 330 adapted to positively engage a hole 332 positioned within the foot 31 8 of the outer casing 308. In particular, latch 330 includes two portions which can be compressed to engage hole 330. However, it will be understood that other types of latching mechanisms commonly known within the art could be used to positively engage the upper casing.

Figure 9:
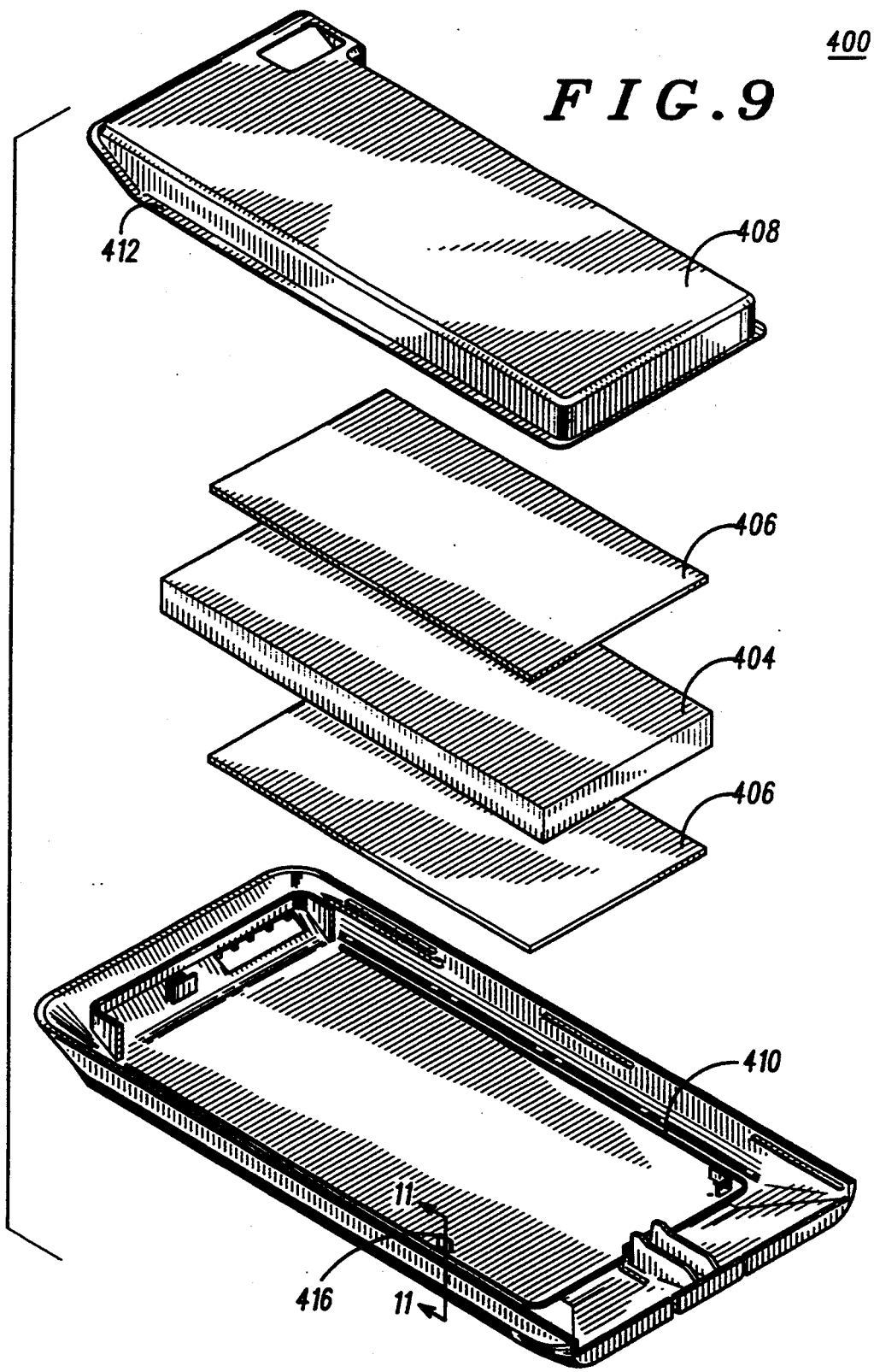
FIG. 9 is a perspective view of a battery pack according to a fourth embodiment of the present invention.

Turning now to FIG. 9, a perspective view of a battery pack according to a fourth embodiment of the battery pack is shown. The battery pack generally includes an outer casing 402 adapted to hold a battery of cells 404. In order to maintain battery 404 within the outer casing 402, an adhesive material 406 could be used on either side of the battery. For example, adhesive 406 could be a glue or some form of double sided tape. Finally, an inner casing 408 is included to maintain battery 404 within outer casing 402.

Unlike the embodiment of FIG. 4, the embodiment of FIG. 9 does not include a wall 310 to retain the battery from shifting within the outer casing and to provide an energy director to enable ultrasonic binding to the shoulder of the outer casing. Rather, an energy director 410 is provided along the surface of outer casing 402 to provide ultra sonic bonding to foot 412 of outer casing 408. The ultrasonic bonding can be provided along the entire energy director 410 or at selected portions.

Figure 10:
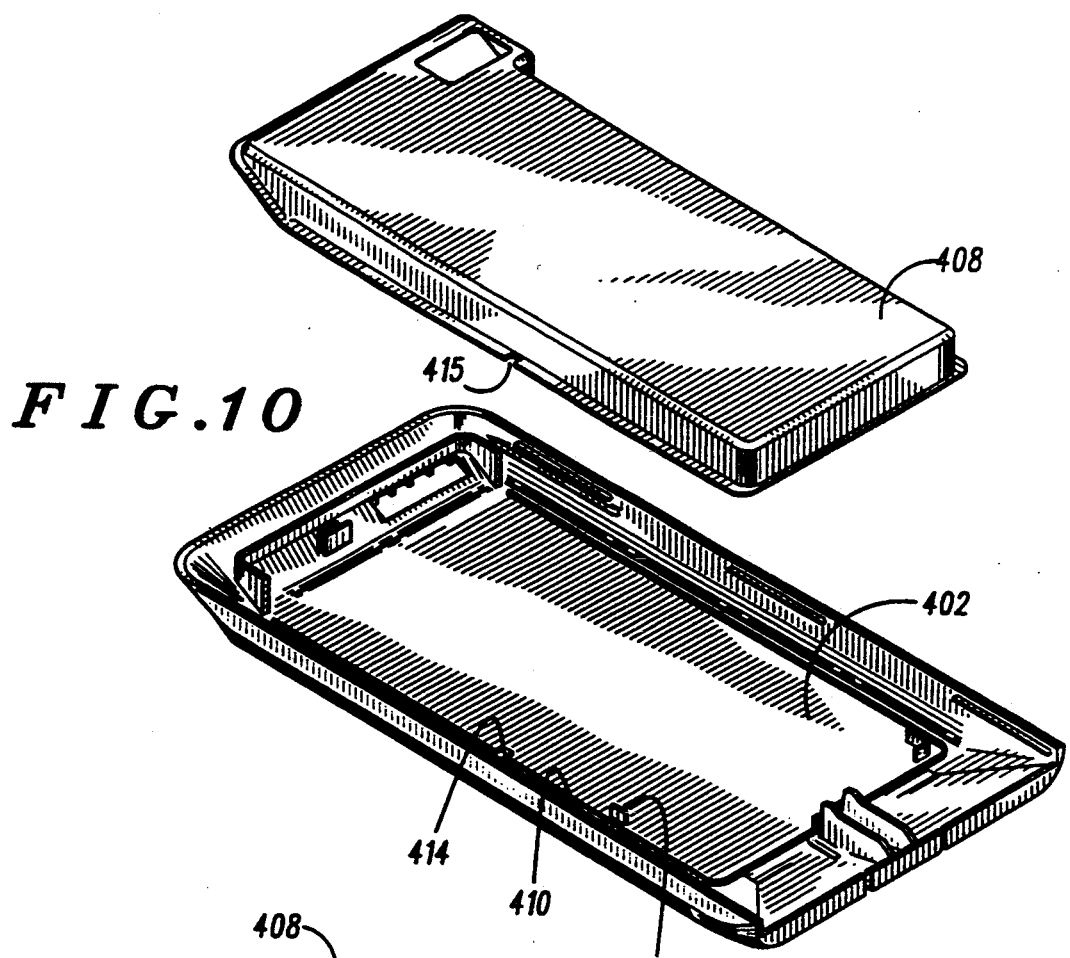
FIG. 10 is an exploded view of an alignment mechanism according to the present invention.

Outer casing 402 can optionally include an alignment tab 414 to enable proper positioning of inner casing 408 relative to outer casing 402 during ultrasonic bonding. The alignment mechanism is shown in detail in FIG. 10. Foot 412 includes a notch 415 adapted to receive a tab 414. Finally, positioning guides 416 can also be selectively positioned to aid the manufacture of the battery. The alignment mechanisms 41 6 are shown in detail in the cross sections of FIGS. 11 and 12 taken at lines B—B of FIG. 9.

Figure 11:
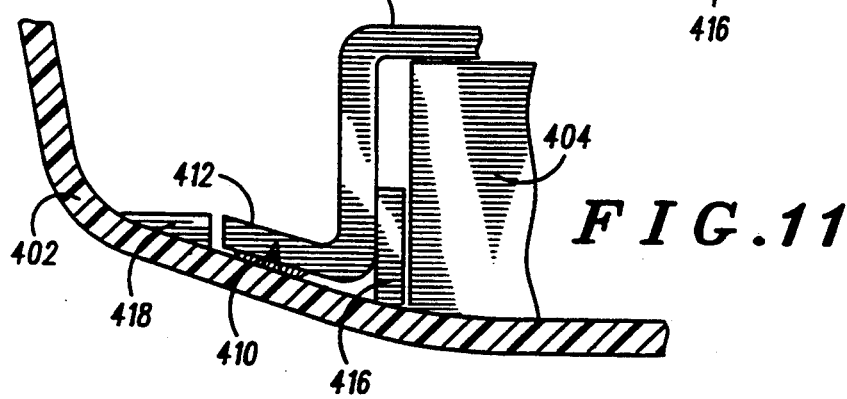
FIG. 11 is a cross-sectional view of the battery pack taken at lines B—B of FIG. 9.

Turning now to FIG. 11, a cross sectional view taken at lines B—B of FIG. 9 shows the alignment of the inner casing 408 with outer casing 402 and the ultrasonic bonding at energy director 410. In particular, positioning guide 416 provides a reference point for inner casing 408. Additionally, an embankment 418 can be included to prevent the movement of foot 412 of inner casing 408 during ultrasonic bonding. That is, because the energy director is positioned along an inclined portion of outer casing 402, foot 412, which is normally horizontal, is forced into an inclined position during the ultrasonic bonding. Accordingly, embankment 418 prevents the movement of foot 412 away from positioning guide 416. Although foot 412 is shown positioned at a particular location along the outer casing 402, it will be understood that energy director 410 be positioned at any location along wall 410.

Figure 12:
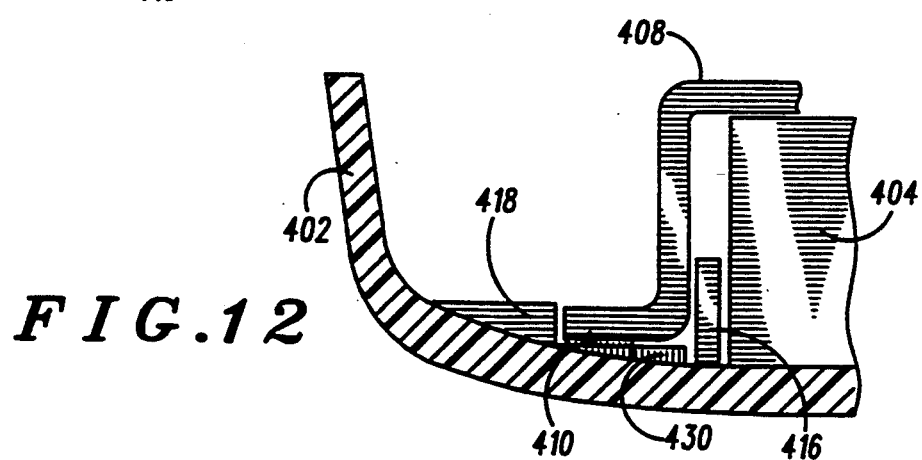
FIG. 12 is an alternate embodiment of the cross-sectional view of FIG. 11.

Turning to FIG. 12, an alternate embodiment incorporates a leveling surface 420 including the energy director 410. Leveling surface 420 prevents foot 412 from being forced to an inclined position during ultrasonic bonding.

In summary, the present invention reduces the complexity for manufacturing and the weight of the completed battery. In particular, a combination of ultrasonic bonding and adhesive bonding can reduce the weight and complexity of the device. A wall can contain the battery. An energy director positioned at the top of the wall to contain the cells of a battery can provide a region for ultrasonic bonding. An inner case can be positioned over the wall to seal the battery. A shoulder of the inner casing can be ultrasonically bonded to the energy director at the top of the wall. Alternatively, the wall can be replaced with an energy director positioned on the outer casing wherein a foot of the inner casing is ultrasonically bonded to the energy director. Accordingly, the present invention reduces complexity and cost compared to prior art devices.

We claim:

1. A battery pack containing at least one cell, comprising:
   an outer casing adapted to receive said at least one cell, said outer casing having an inner surface;
   a bonding surface located on said inner surface of said outer casing;
   an inner casing adapted to encapsulate said at least one cell within said outer casing and having a surface for bonding to said bonding surface of said outer casing; and
   a bond provided at said bonding surface to attach said inner casing to said outer casing within said outer casing.

2. The battery pack of claim 1 wherein said inner casing is molded thermoformed plastic having a shoulder portion and a foot portion, said bond being provided at said foot portion.

3. The battery pack of claim 1 wherein said bonding surface of said outer casing includes an energy director for ultrasonic bonding to said inner casing.

4. The battery pack of claim 1 wherein said bonding surface of said outer casing includes a wall adapted to contain said at least one cell.

5. The battery pack of claim 4 wherein said wall further includes an energy director positioned along an upper surface thereof, said energy director enabling ultrasonic bonding to said inner casing.

6. The battery pack of claim 5 wherein said inner casing is molded thermoformed plastic having a shoulder portion and a foot portion, said bond being provided at said shoulder portion.

7. The battery pack of claim 1 further including a first adhesive layer positioned between said at least one cell and said outer casing.

8. The battery pack of claim 1 wherein said inner casing includes a label integrally formed therein.

9. The battery pack of claim 1 wherein said bond at said bonding surface includes an adhesive material.

10. The battery pack of claim 1 further including a latching mechanism having a tab portion positioned on said outer casing and a receiving portion on said inner casing adapted to receive said tab portion.

11. A battery pack containing at least one cell, comprising:
    an outer casing having an inner surface and
    a wall projecting from said inner surface and adapted to receive said at least one cell;
    a bonding surface located on said outer casing; and
    an inner casing adapted to cover said wall and at least one cell, wherein said inner casing is bonded to said bonding surface of said outer casing.

12. The battery pack of claim 11 wherein said bonding surface includes an energy director for ultrasonic bonding to said inner casing.

13. The battery pack of claim 11 wherein said inner casing is a molded thermoformed cover.

14. A battery pack containing at least one comprising:
    an outer casing adapted to receive said at least one cell;
    an energy director positioned along an inner surface of said outer casing; and
    an inner casing adapted to encapsulate said at least one cell within said outer casing; said inner casing having a foot portion positioned over said energy director, said foot portion being ultrasonically bonded to said energy director.

15. The battery pack of claim 14 wherein said inner casing is a molded thermoformed cover.

16. A method for forming a battery pack comprising the steps of:
    forming a bonding surface along an inner surface of an outer casing;
    positioning at least one cell within said bonding surface of said outer casing of the battery pack;
    encapsulating the at least one cell within said outer casing with an inner casing, the inner casing having a bonding surface corresponding to the bonding surface of the outer casing; and
    bonding the corresponding bonding surface of the inner casing to the bonding surface of the outer casing.

17. The method for forming a battery pack according to claim 16 wherein said step of positioning at least one cell within a bonding surface includes providing an adhesive bonding between the at least one cell and the outer casing.

18. The method for forming a battery pack according to claim 16 wherein said step of positioning at least one cell within a bonding surface includes positioning the at least one cell within a wall of the outer casing to retain the at least one cell.

19. The method for forming a battery pack according to claim 18 wherein said step of bonding the corresponding bonding surface of the inner casing to the bonding surface of the outer casing includes providing an ultrasonic bond at a shoulder of the inner casing to an energy director positioned on the wall of the outer casing.

20. The method for forming a battery pack according to claim 16 wherein said step encapsulating the battery of cells includes providing an adhesive material to bond the inner casing to the battery of cells.

21. The method for forming a battery pack according to claim 16 further including a step of latching said inner casing to said outer casing.

22. The battery pack of claim 11 wherein said bonding surface is an energy director located adjacent said wall.

23. The battery pack of claim 22 wherein said inner casing includes a foot member, said foot member being bonded to said outer casing at said energy director.

24. The battery pack of claim 11 wherein said inner casing includes a shoulder portion, said inner casing being bonded to said wall of said outer casing at said shoulder portion.

25. The battery pack of claim 14 further comprising a wall integrally associated with said outer housing and adapted to receive said at least one cell.

26. The battery pack according to claim 16 wherein said step of bonding the corresponding bonding surface of the inner casing to the bonding surface of the outer casing includes providing an ultrasonic bond at a foot of the inner casing to an energy director positioned on the outer casing.

27. A battery pack containing at least one cell, comprising:
an outer casing having a wall projecting from an inner surface thereof and adapted to receive said at least one cell;
an energy director positioned along an inner surface of said outer casing adjacent said wall; and
an inner casing substantially conforming to the shape of said wall and adapted to encapsulate said at least one cell within said outer casing; said inner casing having a foot portion positioned over said energy director, said foot portion being ultrasonically bonded to said energy director.

* * * * *